United States Patent [19]

Kelly

[11] 3,897,573

[45] July 29, 1975

[54] FISH PRODUCT

[75] Inventor: Kirsteen Ormiston Kelly, Dyce, Scotland

[73] Assignee: Lever Brothers Company, New York, N.Y.

[22] Filed: Dec. 12, 1973

[21] Appl. No.: 423,946

Related U.S. Application Data

[63] Continuation of Ser. No. 250,336, May 4, 1972, abandoned.

[30] Foreign Application Priority Data

May 14, 1971  United Kingdom............... 14929/71

[52] U.S. Cl. ................ 426/272; 426/212; 426/376; 426/382; 426/524
[51] Int. Cl. ........................................... A22c 25/00
[58] Field of Search .......... 426/272, 274, 303, 327, 426/328, 212, 376, 506, 512

[56] References Cited

UNITED STATES PATENTS

| 2,179,122 | 11/1938 | Gamble | 426/303 |
| 2,643,952 | 10/1948 | Crowther et al. | 426/328 |
| 3,036,923 | 5/1962 | Mahon | 426/506 X |
| 3,499,767 | 3/1970 | Schlamb | 426/272 |
| 3,712,821 | 1/1973 | Ronsivalli et al. | 426/274 |

Primary Examiner—A. Louis Monacell
Assistant Examiner—R. A. Yoncoskie
Attorney, Agent, or Firm—Kenneth F. Dusyn

[57] ABSTRACT

Integral moulded blocks or slices of fish such as salmon, trout and saithe are prepared by salting fillets of the fish, coating the salted fillets with a binder prepared from comminuted fish muscle mixed with salt and phosphate and moulding the binder coated fillets to form blocks. The integral blocks may be sliced and smoking with woodsmoke can be carried out before or after slicing.

6 Claims, No Drawings

FISH PRODUCT

This is a continuation of application Ser. No. 250,336, filed May 4, 1972, and now abandoned.

The invention relates to fish and shellfish products and to a method of preparing these products.

Whole fish or the fillets obtained therefrom vary in size and weight according to the age, condition and species of the fish. Accordingly, the fish product manufacturer cannot contemplate mass production of uniform sized portion products directly from whole fish or fish fillets, without being concerned about the inevitable considerable wastage of off-cuts. This problem has been overcome by the manufacture of products such as fish fingers and fish steaks by moulding a mass of cod fillets into a large frozen block which is subsequently cut, while still in the frozen state, into unit portions. In order to hold together the individual pieces of fish fillet within each portion, particularly when not frozen, the manufacturer has found it necessary to enrobe each portion with batter or a breading composition. Whilst a coated fish product of this type supplies a demand for a convenience food, it clearly would be desirable to provide uniform sized unit portions of fish without a protective coating of batter or breading which did not disintegrate on thawing and when served either cooked or uncooked for consumption; this is particularly desirable in the case of saithe and of high value fish such as salmon and trout.

We have now discovered that it is possible to prepare unit portions, particularly slices, of fish of uniform size, shape and weight and having a consistently uniform salt content; furthermore, we have discovered a way in which much of the waste fish including off-cuts, frames and offal can be utilised in making these new products.

Whereas our invention is particularly applicable to the production of smoked fish products, such as smoked salmon or seelachs (smoked saithe, a product popular in Germany), it is understood that smoking is not an essential feature of the process of the invention and therefore that the process is also applicable to the production of unsmoked unit portion fish products.

It should be explained that smoking, otherwise known as smoke curing, as applied to fish is a method of preservation effected by a combination of drying and deposition of naturally produced chemicals resulting from the thermal breakdown of wood. Fish is also smoked in order to give it a pleasant characteristic taste particularly when the availability of other preservative methods such as deep freezing or canning could dispense with the reliance on the traditional preservative function of smoke.

Two main types of smoking process are used for fish: in cold smoking, the temperature of the smoke does not usually rise above 85° – 90°F (30° – 32°C) thus leaving the fish substantially raw, whereas in hot smoking the intention is to cook the fish as well as to smoke it and a smoke temperature of the order of 180° – 200°F (82° – 94°C) is used; this raises the centre temperature of the fish to about 140°F (60°C) or above.

According to the invention, we provide an integral moulded fish product comprising pieces of filleted salted fish bound together at their adjacent surfaces by a binder derived from finely divided raw fish muscle, mixed with from 1 – 10% salt and from 3 – 8% food grade phosphate, both expressed on a wet weight basis in terms of the finely divided raw fish muscle.

The product of our invention can be prepared by a process comprising the following steps:
a. contacting raw fish fillets with salt to provide salted fillets containing from 3 – 20% salt expressed on a wet weight basis,
b. coating the salted fillets with from 5 – 50% by weight of a binder containing finely divided substantially bone-free raw fish muscle mixed with from 1 – 10% salt and from 3 – 8% food grade phosphate, both expressed on a wet weight basis in terms of the finely divided raw fish muscle, and
c. moulding the binder-coated fillets to provide integral blocks of uniform weight, shape and size.

As we have explained, the invention is particularly suited to the production of smoked fish products; accordingly the integral fish blocks of uniform weight, shape and size, which have been obtained by moulding the binder-coated fillets, may if desired subsequently be subjected to woodsmoke.

The fish will usually be in a filleted state and can comprise pieces, strips or chunks of raw fish of any convenient dimension. It is preferable, in order to obtain best quality products, to remove blood-stained and other discoloured parts of the fish before proceeding further with the process.

The salt with which the pieces of fish are initially treated is sodium chloride. The amount of this salt employed should be sufficient to ensure that the fish pieces contain, after this initial salting, not more than about 20%, usually from 3 – 20% and preferably from 3 – 10% salt, expressed on a wet weight basis.

The special binder which is used to coat the pieces of salted fish can be made by finely comminuting raw bone-free fish muscle and adding to 1 part by weight of this, from 0.5 – 1.5 parts by weight of water, from 0.01 – 0.10 parts by weight (1 – 10%) of salt and from 0.03 – 0.08 parts by weight (3 – 8%) of a food grade phosphate, all expressed in terms of the wet weight of comminuted fish muscle. The binder can, for reasons of economy, be prepared from threshings of off-cuts and frames which remain after the fish fillets have been separated, although it is of course possible to employ fish fillets for this purpose.

According to a particularly preferred method of making the special binder for use according to the invention, raw fish off-cuts and frames are mechanically deboned using deboning apparatus such as that manufactured by Baader or Bibun to form comminuted bone-free fish muscle having a moisture content of about 70 – 85%. To 1 part by weight of the comminuted fish paste is added from 0.5 – 1.0 parts by weight of water and from 0.03 – 0.05 parts by weight of salt and 0.03 – 0.05 parts by weight of sodium tripolyphosphate. The ingredients are thoroughly mixed together to form the binder.

It is to be understood that this binder formulation is merely illustrative of the most appropriate binder that serves our purpose; it is of course possible to prepare suitable binders containing a different quantity of water, salt and phosphate from that exemplified, and, furthermore, suitable food grade phosphates or other than tripolyphosphate are available.

In order to carry out the process of the invention, the raw fish fillets are first treated with a salt, usually sodium chloride, before application of the binder, for example by the addition of dry salt or by immersion in or by injection or spraying with a brine solution.

A particularly preferred technique which is applicable to salmon is to mix the skinned fillets with dry vacuum salt in an amount of about 10% of their weight. After allowing time for the salt to penetrate the fish tissue — about 20 – 60 minutes at room temperature is adequate — surplus salt can be removed by rinsing the fillets in brine to provide an overall salt content in the fish of from 3 – 7% expressed on the wet weight of the fish. Use of more salt can of course yield higher levels up to the maximum of about 20%.

A particularly preferred technique which is applicable to saithe is to mix the skinned fillets with 50% by weight of dry salt. After allowing time for the salt to penetrate the fish tissue — about three days at room temperature is adequate — the surplus salt is washed from the fillets by rinsing them in the concentrated brine mother liquor which accumulates during this part of the process.

The salted fillets of whatever species of fish is being processed are then mixed with about 5 – 50%, usually 5 – 25% and preferably 5 – 20% by weight of the special binder and the binder-coated fillets are then moulded and frozen or freeze-moulded to provide slabs or blocks or portions of the required size which, optionally, can subsequently be smoked without necessarily resorting to further subdivision.

In order to obtain the best quality product, it is preferred, particularly in the case of sliced smoked products such as salmon or seelachs, to arrange the individual fillets or pieces of fish in the mould orientated so that they are roughly parallel to each other, thereby ensuring that when the block is subsequently cut or sliced, the grain of the muscle tissue is uniformly rather than randomly arranged in each slice and its appearance is similar to that of slices cut from a side of fish.

If it is intended to produce a smoked product after freezing, the moulded blocks can be transferred, preferably still in the frozen state, direct to a smoke chamber where hot or cold smoking is allowed to proceed according to traditional methods. Whereas it is possible to introduce the moulded blocks into the smoke chamber after they have thawed, it is advisable to handle them only while they are frozen in order to avoid the risk of the individual pieces within the block separating before they become fully bound together as a result of exposure to woodsmoke.

If it is intended to subdivide a moulded block into smaller portions such as slices, for example about 1 – 4 mm thick, there may be a tendency for the block to disintegrate before the binder has become fully effective in holding together the individual pieces of filleted fish which constitute the moulded block. It is accordingly advisable to temper the block by adjusting its temperature to a value below 0°C, dependent on the amount of salt in the product and its effect on the freezing point, at which it can then be sliced or otherwise subdivided without disintegration. As an example when preparing sliced smoked salmon, a block of salmon which has been moulded from individual salmon fillets can be tempered to −7°C and then sliced without the slices disintegrating. Similarly, sliced seelachs can be prepared from a block of saithe tempered to −20°C.

Tempering a moulded block before slicing is a particularly useful procedure to adopt when it is intended to smoke the product after slicing. As with larger unit moulded portions of fish, it is not necessary to subject the slices to woodsmoke while the slices are still frozen, provided of course that care is taken to handle the slices as little as possible before smoking to avoid unnecessary disintegration before the binder has become fully effective.

Although, as we have stated, smoking is not an essential feature of the invention, we have observed that the efficiency of the binder is improved by smoking in that smoked products are less likely to disintegrate than their unsmoked counterparts.

The invention can be particularly usefully applied in the manufacture of premium quality sliced fish products such as smoked salmon or smoked trout or seelachs, but it will be appreciated that the process may equally well be applied to any white fish including cod and haddock or to any shellfish, whether or not it is smoked.

The inventive process can also conveniently be used for preparing large blocks of fish which lend themselves to a continuous high speed mechanical slicing procedure which can be employed before or after optional smoking.

The invention is illustrated by the following Examples.

EXAMPLE 1

Skinned salmon fillets were trimmed to remove red muscle blood stains and then dry salted for 30 minutes with 10% by weight of vacuum salt. Adhering salt crystals were rinsed from the fillets by immersion in brine to provide salted fillets having a salt content of from 3.5 – 5% expressed on total wet weight of the fillets.

The salted fillets were then mixed with 10% by weight of a binder containing the following ingredients which had been macerated to form a thick paste and then deaerated under vacuum:

| | |
|---|---|
| Salmon threshings (bone-free ex Bibun) | 100 g |
| Water | 50 g |
| Salt | 4.5 g |
| Sodium tripolyphosphate | 4.5 g |

The salmon fillets coated with binder were arranged parallel to each other in a plate freezer tray and then frozen under pressure in a plate froster to provide a slab approximately 10 inches × 15 inches × 1½ inches (25 cm × 38 cm × 4 cm). This slab was then cut into smaller blocks — each about 5 inches × 7½ inches (13 cm × 17 cm) — to facilitate subsequent handling and to enable the subsequent smoking procedure to proceed more rapidly.

The frozen blocks were tempered to 16°F (−10°C), surface sprayed with corn oil to prevent them drying out excessively in the smoke chamber, and then transferred to a Torry Kiln and smoked for 6½ hours at 86°F (30°C). A weight loss of 6% was recorded.

The smoked salmon blocks were again frozen to a temperature of about 16°F (−10°C), then sliced parallel to the plane of the original strips which had been arranged in the plate froster.

The slices so obtained were each approximately 5 inches × 7½ inches × 1/16 inches (11 cm × 17 cm × 0.16 cm) in size and were otherwise indistinguishable from smoked salmon which had been sliced from a smoked whole fillet. The line of adhesion between adjacent fillets where the binder had set was hardly discernable in the slices so obtained.

EXAMPLE 2

Skinned saithe fillets were dry salted in a large tank with 50% by weight of fine salt. The mother liquor was retained in the tank and the salting continued until the salt content of the fillets was about 17%, expressed on total wet weight of the fillets. Adhering salt crystals were washed off the fillets by rinsing them in the mother liquor as they were removed from the tank.

The salted fillets were then trimmed to remove all bones, brown muscle and silver membrane. The trimmed fillets were then coated with 15% by weight of a binder containing the following ingredients:

| | |
|---|---|
| Minced saithe fillets (bone-free) | 100 parts |
| Water | 100 parts |
| Salt | 3 parts |
| Sodium pyrophosphate | 3 parts | the binder being made up in a mixer shortly before use.

The saithe fillets coated with binder were arranged parallel to each other along the short side of a block mould, 20 inches × 12 inches × 3 inches (500 mm × 300 mm × 70 mm) and then frozen under pressure in a plate froster. After freezing, the block was sawn to give smaller logs 20 inches × 4 inches × 3 inches (500 mm × 99 mm × 70 mm).

The frozen logs were tempered to −8°F (−20°C) and sliced on a bacon slicing machine to give slices 4 inches × 3 inches × 1/16 inches (90 mm × 70 mm × 1.5 mm). The slices were then brined and dyed in a dye bath containing 4.5% NaCl and the excess dye solution allowed to drain off. The slices were dried and smoked in a Torry Kiln for 40 minutes at 86°F (30°C). A weight loss of 14% was recorded.

The slices so obtained had the same flavour as the traditionally produced seelachs and a less tough texture. The line of adhesion between fillets stuck together with the binder was hardly recognisable as such in the slices consisting of more than one piece of fish.

What is claimed is:

1. A process for the preparation of a sliced smoked fish product, which process comprises the steps of:
    a. contacting raw fillets of salmon, trout or saithe with sodium chloride to provide salted fillets containing from 3 to 20% salt expressed on a wet weight basis;
    b. coating said salted fillets with from 5 to 50% by weight of a binder containing finely divided, substantially bone-free, raw salmon, trout or saithe muscle, mixed with from 1 to 10% sodium chloride and from 3 to 8% of a food grade phosphate selected from sodium tripolyphosphate and sodium pyrophosphate, both said salt and said phosphate being expressed on a wet weight basis in terms of said finely divided raw muscle;
    c. freezing said binder-coated fillets under pressure to provide integral blocks of uniform weight, shape and size;
    d. tempering said blocks to a temperature below 0°C;
    e. cutting said tempered blocks at a temperature below 0°C into slices of from 1 to 4 mm in thickness; and
    f. subjecting said slices at an initial temperature below 0°C to an atmosphere of woodsmoke.

2. A process as claimed in claim 1, wherein said frozen integral blocks are smoked before being tempered and cut.

3. A process as claimed in claim 1, wherein said fillets are contacted with from 3 to 10% by weight of sodium chloride.

4. A process as claimed in claim 1, wherein said salted fillets are coated with from 5 to 25% by weight of said binder.

5. A process as claimed in claim 2, wherein said fillets are contacted with from 3 to 10% by weight of sodium chloride.

6. A process as claimed in claim 2, wherein said salted fillets are coated with from 5 to 25% by weight of said binder.

* * * * *